United States Patent [19]

Rundkvist et al.

[11] Patent Number: 5,687,069
[45] Date of Patent: Nov. 11, 1997

[54] RECTIFIER BRIDGE APPARATUS

[75] Inventors: Kjell Rundkvist, Lidingö; Eric Groth, Solna, both of Sweden

[73] Assignee: Telefonaktiebolaget LM Ericsson, Stockholm, Sweden

[21] Appl. No.: 646,315

[22] PCT Filed: Sep. 27, 1995

[86] PCT No.: PCT/SE95/01101

§ 371 Date: May 13, 1996

§ 102(e) Date: May 13, 1996

[87] PCT Pub. No.: WO96/10862

PCT Pub. Date: Apr. 11, 1996

[30] Foreign Application Priority Data

Sep. 30, 1994 [SE] Sweden .................................. 9403292

[51] Int. Cl.[6] .................................................. H02M 7/06
[52] U.S. Cl. .................................................. 363/126; 363/53
[58] Field of Search .................................... 363/39, 44, 45, 363/46, 52, 53, 125, 126

[56] References Cited

U.S. PATENT DOCUMENTS 4,412,278  10/1983  Cambier et al. .................... 363/126
4,672,522   6/1987  Lesea .................................. 363/126
4,910,654   3/1990  Forge .................................. 363/49
5,200,887   4/1993  Ioroi et al. ........................... 363/143

FOREIGN PATENT DOCUMENTS 477367  1/1992  European Pat. Off. .

OTHER PUBLICATIONS

Irving L. Kosow, *Control of Electric Machines*, pp. 89–93 (1973).

*Primary Examiner*—Matthew V. Nguyen
*Attorney, Agent, or Firm*—Burns, Doane, Swecker & Mathis, L.L.P.

[57] ABSTRACT

In a rectifier bridge, a method and system for starting a DC-driven device without the occurrence of a current surge. The input of the rectifier bridge is connected to a three-phase source and a storage capacitor is connected across the output of the rectifier bridge. At least two of the three input terminals of the rectifier bridge are each connected in series to a respective AC capacitor. Each of the capacitors is connected in parallel with a respective controlled switch which functions to short-circuit the capcitors subsequent to the storage capacitor being charged.

26 Claims, 2 Drawing Sheets

5,687,069

RECTIFIER BRIDGE APPARATUS

TECHNICAL FIELD

The present invention relates to a rectifier bridge arrangement for starting a DC-driven device with the absence of current surges, wherein the inputs of the rectifier bridge are intended for connection to a three-phase source, and wherein a storage capacitor is connected across the output of the rectifier bridge.

BACKGROUND ART

Electronic apparatus that are powered by alternating current will normally have an energy reservoir in the form of a storage capacitor, which may be supplemented with further circuits elements in order to ensure that energy will be delivered when the level of the AC voltage is low.

The storage capacitor must be relatively large, in order to ensure reliable operation. As a result, an unacceptably high start current, i.e. a current surge, will be delivered to the electronic apparatus when a voltage is applied thereto, unless counteractive measures are taken.

This problem is normally solved with the aid of a resistor connected in series with the storage capacitor in the case of the single-phase connection, or with the aid of resistors connected in series to at least two connecting terminals of the rectifier bridge in the case of the three-phase connection. This resistor, or these resistors, restricts/restrict the level of the charging current to the storage capacitor when starting of the electronic apparatus, whereafter the resistor or resistors is/are short-circuited to enable continued use of the storage capacitor(s) as an energy reservoir.

One serious drawback with this solution is that the resistor or resistors become very hot when the electronic apparatus is started-up repeatedly over a short period of time.

U.S. Pat. No. 4,910,654 teaches a load-connected arrangement which comprises a rectifier bridge which includes four diodes, a series circuit which comprises two storage capacitors and which is connected in parallel between the load and the rectifier bridge, and a third capacitor whose one connecting terminal is connected to an output terminal of the rectifier bridge and whose other connecting terminal is intended for connection to a first connecting terminal on a single-phase source. One connecting terminal of a controllable switch is connected to the other connecting terminal of the third capacitor and the other connecting terminal of the switch is connected to one input terminal on the rectifier bridge. The other input terminal of the rectifier bridge is connected directly to a second connecting terminal on the single-phase source. This arrangement functions by reducing the starting current to a suitable level during a start sequence, by virtue of the third capacitor being connected in series with the two storage capacitors via two of the diodes in the rectifier bridge. The switch is then closed to allow normal operation to take place, wherein the third capacitor functions to control the voltage level across the storage capacitors. This arrangement is very satisfactory in the case of a single-phase source. However, the publication does not mention that the arrangement can be adapted for connection to a three-phase source, nor yet how such adaptation may be effected. However, if the arrangement described in the U.S. publication were to be adapted to a three-phase source, in spite of the lack of a disclosure to this effect, there would be obtained a circuit in which the rectifier bridge also included a fifth and a sixth diode connected in parallel across the storage capacitors, a fourth capacitor whose one connecting terminal is connected to the same output terminal on the rectifier bridge as the third capacitor, and whose other connecting terminal is connected to a first connecting terminal on a second switch whose other connecting terminal is connected to the point of interconnection between the fifth and the sixth diodes. In this case, the point of electrical interconnection between the fourth capacitor and the second switch is intended for connection to a third connecting terminal on the three-phase source. It is also assumed that the two remaining connecting terminals of the three-phase source are intended to be connected to the arrangement in the same way as the connecting terminals of the single phase source. In the case of an arrangement modified in this way, there would obtained with the same capacitance on the third and the fourth capacitors a capacitive voltage division of the input voltage such that if the same input voltages are used, the voltage available to charge the storage capacitors would be somewhat lower than in the single phase case. This would mean that the time taken to charge the storage capacitors would be longer than otherwise desired and thus result in a slower start sequence before the switches could be switched for normal operation.

SUMMARY OF THE INVENTION

The object of the present invention is to eliminate the development of heat in the resistors used with hitherto known arrangements intended for connection to a three-phase source.

This object is achieved with the inventive arrangement by connecting at least two of the three input terminals of the rectifier bridge in series with a respective AC capacitor, and connecting respective AC capacitors in parallel with a controlled switch for short-circuiting an associated AC capacitor subsequent to the storage capacitor having been charged.

Another object of the invention is to limit a current surge obtained after starting-up the arrangement but before the AC capacitors begin to function.

This further object is achieved by virtue of the inventive arrangement including an inductor which is connected between an output terminal on the rectifier bridge and a connecting terminal on the storage capacitor.

The advantage afforded with the use of an AC capacitor as a current limiter instead of a resistor is that no heat is generated and the apparatus is therefore able to tolerate repeated starts with no problem.

BRIEF DESCRIPTION OF THE DRAWING

The invention will now be described in more detail with reference to the accompanying drawing, in which.

BEST MODES OF CARRYING OUT THE INVENTION

Figure 1:
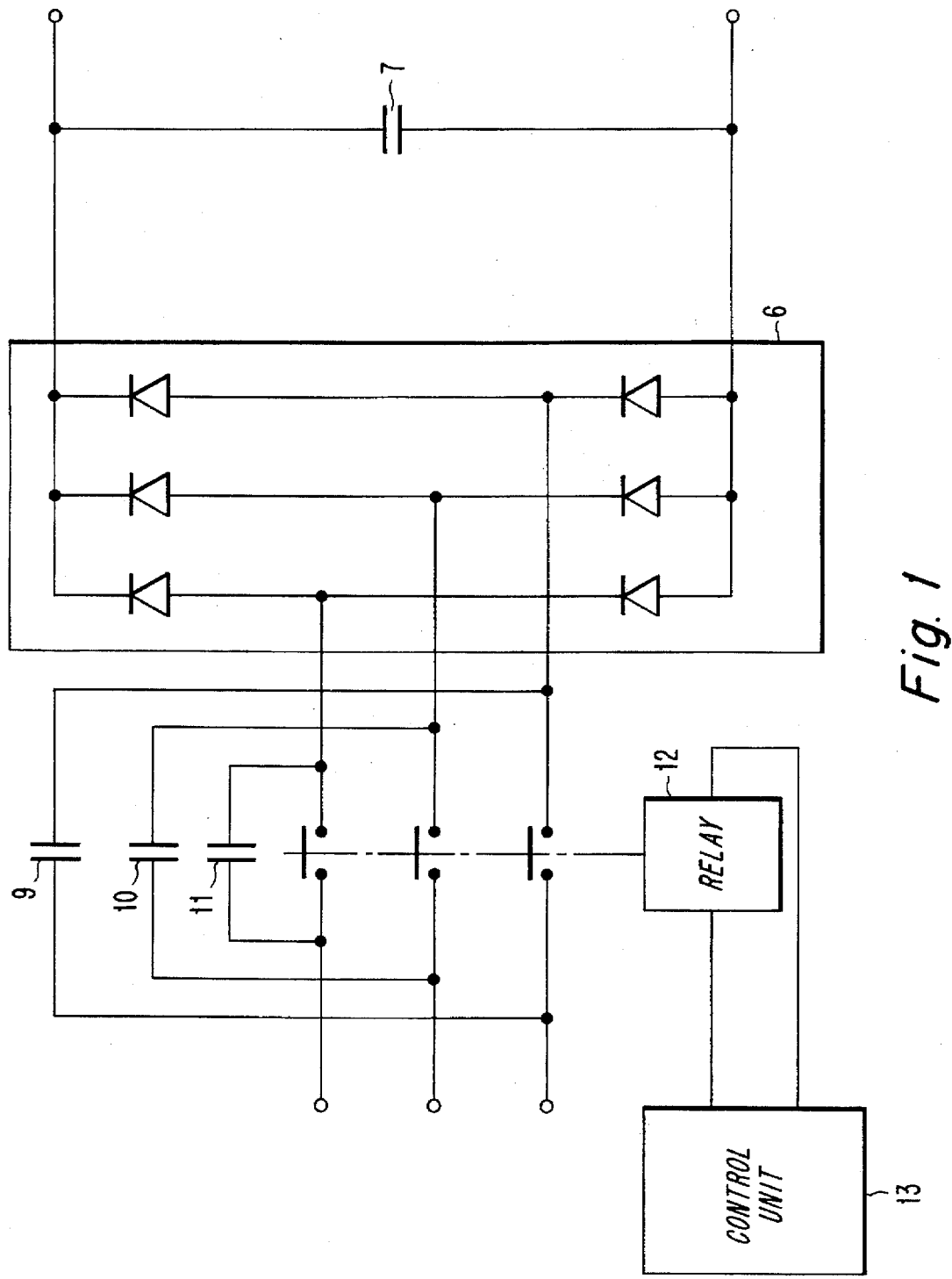
FIG. 1 illustrates one embodiment of an inventive arrangement.

FIG. 1 illustrates a rectifier bridge 6 which is intended to deliver alternating current to an electronic apparatus (not shown) across its outputs. To ensure reliable operation of the electronic apparatus (not shown), a storage capacitor 7 is connected across the output of the rectifier bridge 6. The storage capacitor 7 must be relatively large and consequently unacceptably high start currents, so-called current surges, will be generated when voltage is applied to the apparatus (not shown).

To reduce the start current to an acceptable level, the three input terminals of the rectifier bridge 6 of the inventive arrangement are each connected in series with a respective AC capacitor 9, 10 and 11, to limit the alternating current delivered to the rectifier bridge 6 during the start sequence. The AC capacitors 9, 10 and 11 are each connected in parallel with a respective controlled switch which function to short-circuit respective AC capacitors 9, 10, 11 subsequent to the storage capacitor 7 being charged. In this regard, it can be mentioned that in the case of three-phase supply without 0-conductors, it would be possible to limit the start current by connecting-up AC capacitors in only two of the phases.

In the case of the embodiment illustrated in FIG. 1, the controlled switches are comprised of a relay 12 having three circuit making contacts, each of which can be short-circuited by its respective capacitor 9, 10 or 11.

In the illustrated case, the relay 12 is controlled by a control unit 13 which may be constructed to cause the relay 12 to short-circuit the AC capacitors 9, 10 and 11 after a predetermined start time, after which it is assumed that the voltage across the storage capacitor 7 will have reached its predetermined value. Alternatively, the control unit 13 may be constructed to detect the voltage across the storage capacitor 7 in a manner not shown, and to cause the relay 12 to short-circuit the AC capacitors 9, 10 and 11 when the voltage across the storage capacitor 7 has reached its predetermined value.

Figure 2:
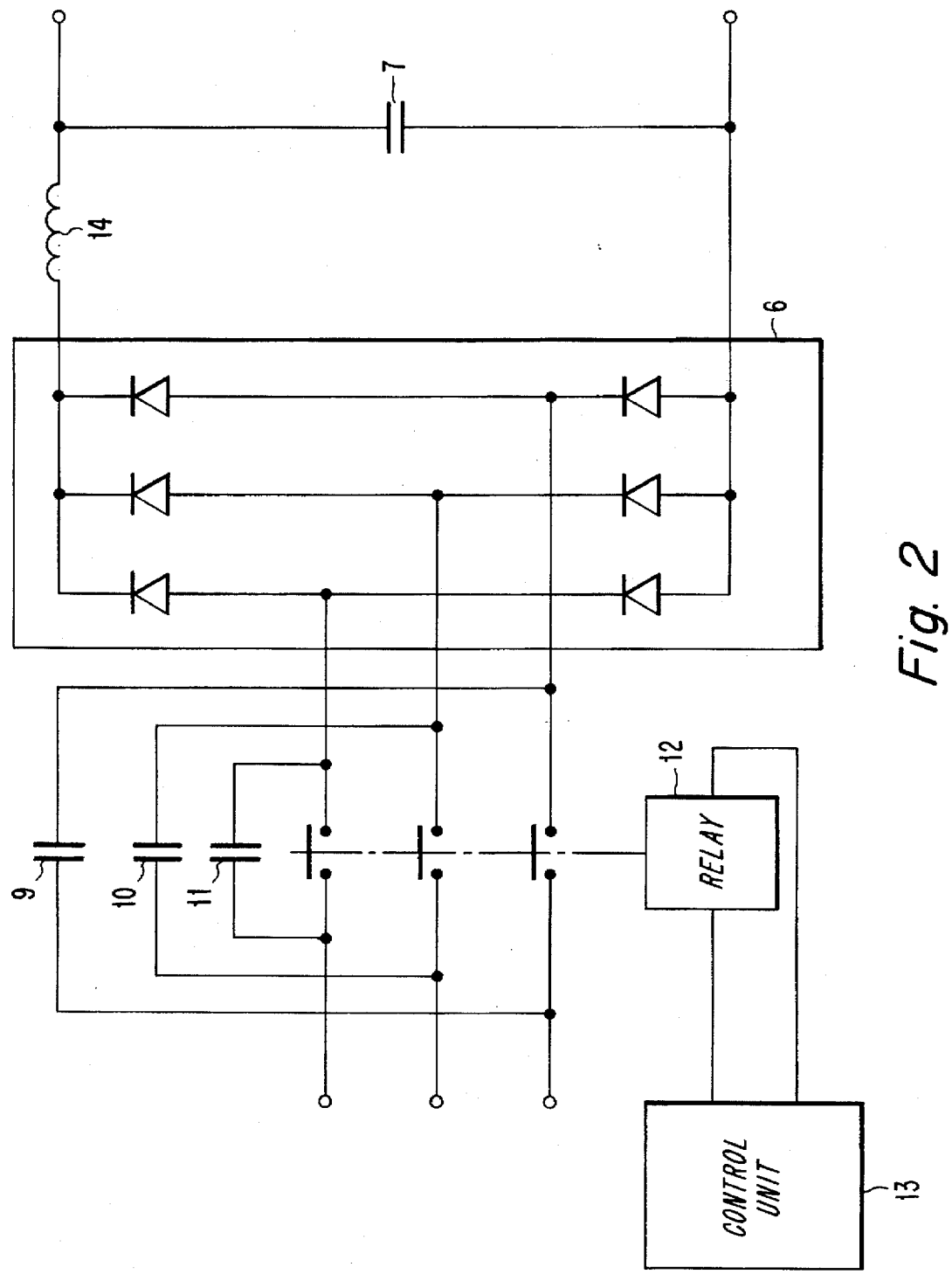
FIG. 2 shows the arrangement of FIG. 1 supplemented with an inductor.

The inventive arrangement illustrated in FIG. 2 differs from the arrangement illustrated in FIG. 1 by virtue of an inductor or coil 14 connected in series between the rectifier bridge 6 and the storage capacitor 7. The inductor is connected in series between a first output terminal on the rectifier bridge 6 and a first connecting terminal on the storage capacitor 7. The inductor 14 may equally as well be connected between the second output terminal of the rectifier bridge 6 and the second connecting terminal of the storage capacitor 7. The inductor 14 functions to limit the current delivered to the storage capacitor 7 during the start sequence. In order for the AC capacitors 9, 10 and 11 to be able to limit the current to the storage capacitor, it is necessary to charge the capacitors. This can be quickly achieved and if the arrangement is started-up when the AC voltage source has zero crossing, no current surge will occur. On the other hand, if the arrangement is started-up when the AC voltage source has its peak value or a very high value, there will be generated a current surge which when the arrangement is used in a radio system for instance will be discerned as a click or noise. The inductor 14 limits the initial current for a short period of time, which is sufficiently long, however, for the capacitors 9, 10 and 11 to be charged. It also fulfils subsequent further functions. For instance, the inductor also maintains the output voltage of the storage capacitor 7 at a high level which is smoother than would otherwise be the case, and also causes the input current from the electric network to be more sinusoidal than would otherwise be the case, therewith exerting a smaller load on the network.

Because the inventive arrangement uses AC capacitors, optionally in combination with an inductor, as current limiters instead of resistors, no heat will be developed in theory, and consequently the electronic apparatus (not shown) and its start circuit will tolerate repeated starts with no problems whatsoever.

We claim:

1. A rectifier bridge for starting a DC-driven device without current surges, the system comprising:

an output of said rectifier bridge;

a storage capacitor connected across said output;

an input of said rectifier bridge, said input comprising three terminals for connection to a three-phase source; and at least two terminals of said input connected in series to respective AC capacitors, said AC capacitors connected in parallel to a controlled switch for short-circuiting said AC capacitors subsequent to said storage capacitor being charged.

2. The system of claim 1, wherein said output comprises output terminals, the system further comprising an inductor connected in series between one output terminal and a connecting terminal on said storage capacitor.

3. The system of claim 1, wherein said controlled switch short-circuits said AC capacitors after a predetermined time has elapsed.

4. The system of claim 1, wherein said controlled switch short-circuits said AC capacitors when the voltage across said storage capacitor has reached a predetermined value.

5. The system of claim 2, wherein said controlled switch short-circuits said AC capacitors after a predetermined time has elapsed.

6. The system of claim 2, wherein said controlled switch short-circuits said AC capacitors when the voltage across said storage capacitor has reached a predetermined value.

7. A method of using a rectifier bridge for starting a DC-driven device without current surges wherein said rectifier bridge comprises an input with three terminals and an output, the method comprising the steps of:

connecting a storage capacitor across said output;

connecting a three-phase source to said three terminals;

connecting at least two terminals of said input in series to respective AC capacitors;

connecting said AC capacitors in parallel to a controlled switch; and short-circuiting said AC capacitors subsequent to said storage capacitor being charged.

8. The method of claim 7, wherein said output comprises output terminals, wherein said method further comprises the step of connecting an inductor in series between one output terminal and a connecting terminal on said storage capacitor.

9. The method of claim 7, wherein said step of short-circuiting further comprises the step of short-circuiting said AC capacitors after a predetermined time has elapsed.

10. The method of claim 7, wherein said step of short-circuiting further comprises the step of short-circuiting said AC capacitors when the voltage across said storage capacitor has reached a predetermined value.

11. The method of claim 8, wherein said step of short-circuiting further comprises the step of short-circuiting said AC capacitors after a predetermined time has elapsed.

12. The method of claim 8, wherein said step of short-circuiting further comprises the step of short-circuiting said AC capacitors when the voltage across said storage capacitor has reached a predetermined value.

13. A rectifier bridge for starting a DC-driven device the system comprising:

an output of said rectifier bridge;

a storage capacitor connected across said output;

an input of said rectifier bridge, said input comprising three terminals for connection to a three-phase source; and at least two terminals of said input connected in series to respective means for limiting current upon startup of said DC-driven device, said means for limiting current connected in parallel to a controlled switch for shortcircuiting said means for limiting current subsequent to said storage capacitor being charged;

wherein said means for limiting current generates substantially no heat.

14. The system of claim 13, wherein said means for limiting current upon startup of said DC-dfiven device comprises an AC capacitor.

15. The system of claim 13, wherein said output comprises output terminals, the system further comprising an inductor connected in series between one output terminal and a connecting terminal on said storage capacitor.

16. The system of claim 13, wherein said controlled switch shortcircuits said means for limiting current after a predetermined time has elapsed.

17. The system of claim 13, wherein said controlled switch shortcircuits said means for limiting current when the voltage across said storage capacitor has reached a predetermined value.

18. The system of claim 14, wherein said controlled switch shortcircuits said means for limiting current after a predetermined time has elapsed.

19. The system of claim 14, wherein said controlled switch shortcircuits said means for limiting current when the voltage across said storage capacitor has reached a predetermined value.

20. A rectifier bridge for starting a DC-driven device the system comprising:

an output of said rectifier bridge;

a storage capacitor connected across said output;

an input of said rectifier bridge, said input comprising three terminals for connection to a three-phase source; and at least two terminals of said input connected in series to respective means for capacitively limiting current upon startup of said DC-driven device, said means for capacitively limiting current connected in parallel to a controlled switch for shortcircuiting said means for capacitively limiting current subsequent to said storage capacitor being charged.

21. The system of claim 20, wherein said means for capacitively limiting current upon startup of said DC-driven device comprises an AC capacitor.

22. The system of claim 20, wherein said output comprises output terminals, the system further comprising an inductor connected in series between one output terminal and a connecting terminal on said storage capacitor.

23. The system of claim 20, wherein said controlled switch shortcircuits said means for capacitively limiting current after a predetermined time has elapsed.

24. The system of claim 20, wherein said controlled switch shortcircuits said means for capacitively limiting current when the voltage across said storage capacitor has reached a predetermined value.

25. The system of claim 21, wherein said controlled switch shortcircuits said means for capacitively limiting current after a predetermined time has elapsed.

26. The system of claim 21, wherein said controlled switch shortcircuits said means for capacitively limiting current when the voltage across said storage capacitor has reached a predetermined value.

* * * * *